(12) United States Patent
Kawamura

(10) Patent No.: US 7,875,353 B2
(45) Date of Patent: Jan. 25, 2011

(54) MULTILAYERED PELLET AND MOLDED RESIN

(75) Inventor: Syukiti Kawamura, Kurashiki (JP)

(73) Assignee: Kuraray Co., Ltd, Kurashiki-shi (JP)

( * ) Notice: Subject to any disclaimer, the term of this patent is extended or adjusted under 35 U.S.C. 154(b) by 737 days.

(21) Appl. No.: 11/574,424

(22) PCT Filed: Sep. 2, 2005

(86) PCT No.: PCT/JP2005/016117

§ 371 (c)(1),
(2), (4) Date: Feb. 28, 2007

(87) PCT Pub. No.: WO2006/025528

PCT Pub. Date: Mar. 9, 2006

(65) Prior Publication Data

US 2009/0143534 A1    Jun. 4, 2009

(30) Foreign Application Priority Data

Sep. 3, 2004   (JP) ............................. 2004-257485

(51) Int. Cl.
*C08F 77/00* (2006.01)
*C08L 77/00* (2006.01)
(52) U.S. Cl. .......... 428/407; 428/403; 525/56; 525/178; 525/421; 525/426; 525/420; 523/201
(58) Field of Classification Search .......... 428/407, 428/403; 525/60, 178, 421, 426, 420; 523/201
See application file for complete search history.

(56) References Cited

U.S. PATENT DOCUMENTS 6,110,549 A * 8/2000 Hamada et al. ............ 428/35.2
6,297,345 B1 * 10/2001 Okushita et al. ............ 528/170
7,534,829 B2 * 5/2009 Tai et al. ..................... 524/503
2005/0009987 A1 * 1/2005 Hara et al. ..................... 525/56
2005/0027053 A1 * 2/2005 Uchiumi et al. ............. 524/404

FOREIGN PATENT DOCUMENTS

| JP | 59-81121 | 5/1984 |
| JP | 4 114060 | 4/1992 |
| JP | 4-114060 | 4/1992 |
| JP | 2001-302806 | 10/2001 |
| JP | 2001 302806 | 10/2001 |
| JP | 2002 332360 | 11/2002 |
| JP | 2002-332360 | 11/2002 |
| WO | WO 03072653 A1 * | 9/2003 |

OTHER PUBLICATIONS

English Abstract of DE 3921210, Bernhard, Jul. 1990.*
Machine Translation of DE 3922120 C1 (1989).*

* cited by examiner

*Primary Examiner*—Callie E Shosho
*Assistant Examiner*—Ronak Patel
(74) *Attorney, Agent, or Firm*—Oblon, Spivak, McClelland, Maier & Neustadt, L.L.P.

(57) ABSTRACT

Multilayered pellets are provided that contain an ethylene-vinyl alcohol copolymer (EVOH) and a polyamide resin and that have excellent thermal stability during pelletizing and melt molding. The multilayered pellets each are composed of at least two resin layers and include a resin layer A whose main component is EVOH and a resin layer B whose main component is a polyamide resin. In the multilayered pellets, at least 70 mol % of all the terminals of the polyamide resin are blocked by units each containing an imide structure.

15 Claims, 1 Drawing Sheet

MULTILAYERED PELLET AND MOLDED RESIN

TECHNICAL FIELD

The present invention relates to multilayered pellets each containing an ethylene-vinyl alcohol copolymer (hereinafter may be abbreviated as "EVOH") layer and a polyamide layer. The present invention also relates to resin molded articles that are produced from the multilayered pellets.

BACKGROUND ART

Resin compositions containing EVOH and a polyamide resin have a gas barrier property, oil resistance, and solvent resistance that are provided by the EVOH while having hot water resistance that is provided by the polyamide resin. They are suitable for packaging materials that are used for boiling or retort applications, for example Conventionally, molded articles (films, sheets, etc.) made of the aforementioned resin compositions are produced by melt molding with, for example, a melt extruder using pellets as a raw material with the pellets being obtained by heating and melting EVOH and a polyamide resin to mix them together and then forming this into pellets.

However, when EVOH, and a conventional polyamide resin are mixed in a molten state gels that are thermally deteriorated products are produced due to the contact therebetween and thereby pellets containing gels are formed. When such pellets are used as a raw material for molded articles besides the gels contained in the pellets, more gels are produced during melt molding. Accordingly a number of gels remain in the molded articles. Thus molded articles with sufficiently high quality cannot be obtained.

In order to solve such a problem, a method is proposed in which a polyamide resin with a specific composition is used and is dry-blended or pelletized together with EVOH. For instance, JP4 (1992)-114060A discloses a technique of using a polyamide resin that has been modified with acid anhydride, carboxylic acid, carboxylate ester, etc so that the content of the terminal amino groups is 30µ equivalents (eq)/g or less. In JP4(0992)-114060A, an improvement in the thermal stability during melt molding (an reduction in the amount of gels to be produced) is intended to be achieved. However, as indicated in the comparative examples to be described later, this technique does not provide a sufficiently high effect of improving the thermal stability, particularly in the case of pelletizing.

On the other hand, JP59 (1984)-081121A discloses a multilayered pellet having a core-sheath structure composed of a core layer and a sheath layer. The multilayered pellet disclosed in JP59 (1984)-81121A is a multilayered pellet containing an olefin-vinyl alcohol copolymer as the core layer and an olefin resin as the sheath layer. This multilayered pellet is formed as follows. That is, with a melt whose main component is an olefin-vinyl alcohol copolymer being used for a core and a melt whose main component is an olefin resin being used for a sheath, they are melt-extruded in the form of a strand and then this is cut after being cooled. Thus a multilayered pellet is formed. This method makes it possible to pelletize an olefin-vinyl alcohol copolymer that is difficult to be melt-extruded in the form of a strand by itself due to its low melt tension while allowing the pellets formed by the method to be prevented from absorbing water by using the olefin resin for the sheath layer.

DISCLOSURE OF INVENTION

The present invention is intended to provide a multilayered pellet that contains EVOH and a polyamide resin and has excellent thermal stability during pelletizing and melt molding.

The multilayered pellet of the present invention is composed of at least two resin layers. The multilayered pellet includes a resin layer A whose main component is an ethylene-vinyl alcohol copolymer (A) and a resin layer B whose main component is a polyamide resin (B). At least 70 mol % of all the terminals of the polyamide resin (B) are blocked by units each containing an imide structure.

A resin molded article of the present invention is a molded article obtained by melt-molding multilayered pellets of the present invention described above.

DESCRIPTION OF THE PREFERRED EMBODIMENTS

Figure 1:
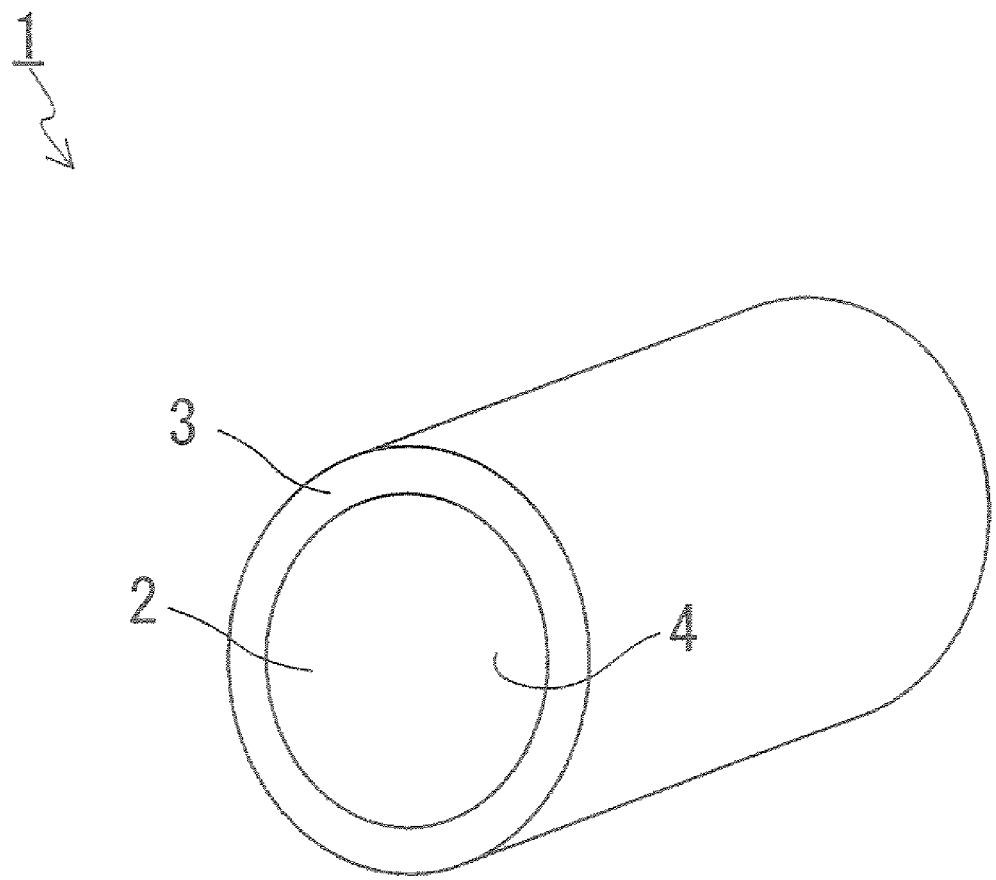
FIG. 1 is a schematic view showing an example of a multilayered pellet according to the present invention.

The multilayered pellet of the present invention has excellent thermal stability during pelletizing and melt molding. Accordingly, the multilayered pellet can prevent gels from being formed during the respective stages of pelletizing and melt molding. When the multilayered pellet of the present invention is used as a raw material and is melt-molded, the amount of residual gels is reduced and thereby a resin molded article (hereinafter may be referred to simply as a "molded article") with better quality (excellent properties such as an excellent gas-barrier property, hot water resistance, appearance, etc.) can be obtained.

The term "main component" denotes that the resin layer A may contain materials other than the EVOH (A) while the resin layer B may contain materials other than the polyamide resin (B). The content of the materials in each resin layer is not particularly limited as long as the multilayered pellet satisfies the properties required for a raw material for a resin molded article and the effects that are provided by the present invention are not hindered. For instance, the content may be about 40 wt % or less, preferably about 10 wt % or lower. Examples of the aforementioned materials include various additives such as antioxidants, coloring agents, UV absorbers, slip agents, antistatic agents, plasticizers, crosslinking agents such as sulfuric acids, inorganic fillers, inorganic desiccants, etc., and super absorbent polymer resins, etc.

In the multilayered pellet of the present invention, the resin layer A may be formed of EVOH (A) while the resin layer B may be formed of a polyamide resin (P).

The configuration (the shape of pellets, the number of each resin layer, and the positional relationship between respective resin layers) of the multilayered pellet of the present invention is not particularly limited as long as the resin layers A and B are included in the multilayered pellet. As shown in FIG. 1, however, it is preferable that the multilayered pellet 1 of the present invention have a core-sheath structure including the resin layer A as a core layer 2 and the resin layer 1 as a sheath layer 3 that covers the peripheral surface of the core layer 2. In this case, the resin layer 3 can prevent the pellet from absorbing water. In addition, since heat is conducted gradually from the outer side to the inner side of the pellet during melt molding, the resin layer B with a relatively high melting point is disposed as the sheath layer 3 while the resin layer A with a relatively low melting point is disposed as the core layer 2. This allows the both to be mixed together more homogeneously while preventing unmelted gels from being produced. In the multilayered pellet 1 shown in FIG. 15 the resin layer A is exposed at the end face 4 thereof but the resin layer A may be covered with the resin layer B at the end face 4. The end faces and peripheral surface of the pellet can be judged from the shape of the strand from which the pellet is formed. For instance, the surface at which the strand is cut by a pelletizer becomes an end face of the pellet.

The EVOH (A) that is the main component of the resin layer A (EVOH layer) can be obtained by saponifying an ethylene-vinyl ester copolymer. A typical vinyl ester is vinyl acetate. However, it can be another vinyl ester, for example fatty acid vinyl ester (vinyl propionate, vinyl pivalate).

The content of the ethylene units in the EVOH (A) is preferably in the range of 10 to 65 mol %, more preferably in the range of 20 to 45 mol %. When the content of the ethylene units is less than 10 mol %, the molded article obtained may have a deteriorated gas barrier property under high humidity. On the other hand, when the content of the ethylene units exceeds 65 mol %, a molded article with a sufficiently high gas barrier property may not be obtained.

The saponification degree of the EVOH (A) is preferably at least 90 mol %, more preferably at least 96 mol %, and further preferably at least 98 mol %. When the saponification degree is lower than 90 mol %, the molded article obtained may have a deteriorated gas barrier property under high humidity.

The EVOH (A) may contain a small amount (for example, 10 mol % or less) of a copolymerizable component other than ethylene and vinyl alcohol. Examples of the copolymerizable component include: alpha-olefins such as propylene, isobutene, 4-methyl-1-pentene, hexene, and octene; unsaturated carboxylic acids such as itaconic acid, methacrylic acid acrylic acid, and maleic anhydride, as well as salts thereof, partial or complete esters thereof, nitrites thereof amides thereof, and anhydrides thereof; vinylsilane-based compounds such as vinyltrimethoxysilane; and unsaturated sulfonic acids and salts thereof.

The melt flow rate (MFR) (at 230° C. under a load of 2160 g) of the EVOH (A) is preferably 1 to 50 g/10 minutes, more preferably 5 to 30 g/10 minutes. The MFR can be measured according to JIS K 7210. When the resin layer A contains a material other than the EVOH (A), it is preferable that the MFR of the resin layer A be in the aforementioned ranges.

Various trace components (carboxylic acids and salts thereof, phosphoric acid compounds, boron compounds, alkali metal salts, alkaline earth metal salts, etc.) that improve various properties of the molded article obtained may be added to the EVOH (A).

In the polyamide resin (B) that is the main component of the resin layer B (polyamide resin layer), at least 70 mol % of all the terminals thereof are blocked by units each containing an imide structure. When this ratio is less than 70 mol %, it is difficult to prevent gels from being produced during pelletizing and melt molding. This ratio is preferably at least 75 mol %, more preferably at least 80 mol %.

The imide structure is not particularly limited but it is preferable that at least part of the imide structure be a cyclic imide structure. Examples of the cyclic imide that constitutes such a structure include phthalimide, succinimide, glutarimide, 3-methylglutarimide, maleimide, dimethylmaleimide, trimellitimide, and pyromellitimide. Among them phthalimide and succinimide are preferable.

The amount of the terminal amino groups in the polyamide resin (B) is preferably ten/one-million equivalents per 1 g of the resin, that is, 10 µeq/g or less, more preferably 7 µeq/g or less, and further preferably 4 µeq/g or less. When the amount of the terminal amino groups exceeds 10 µeq/g, it tends to be difficult to obtain the effect of preventing gels from being produced during pelletizing and melt molding.

Although the type of the polyamide resin (B) is not particularly limited it is preferably a polyamide resin that is composed mainly of caproamide. Specifically, it is preferable that at least 75 mol % of the structure units of the polyamide resin (B) be caproamide units. Examples of such a polyamide resin (B) include polycapramide (PA6), a caprolactam/lauryllactam copolymer (PA6/12), a caprolactam/hexamethylene adipamide copolymer (PA6/66), etc.

Examples of the structure units other than the caproamide units in the polyamide resin (B) include structure units derived from: cyclic lactams such as butyrolactam, lauryllactam, etc; amino carboxylic acids such as 1,10-aminodecanoic acid, 1,12-aminododecanoic acid, etc.; dicarboxylic acids such as malonic acid, succinic acid, glutanic acid, adipic acid, pimelic acid, suberic acid, azelaic acid, sebacic acid, undecanedioic acid, dodecanedioic acid, hexadecanedioic acid, eicosanedioic acid, eicosenedioic acid, docosanedioic acid, 2,2,4-trimethyladipic acid, dimer acid, 1,4-cyclohexane dicarboxylic acid, terephthalic acid, isophthalic acid, phthalic acid, xylylenedicarboxylic acid, etc.; and diamines such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, hexadecamethylenediamine, 2,2,4 (or 2,4,4)-trimethylhexamethylenediamine, cyclohexanediamine, methylcyclohexanediamine, bis-(4,4'-aminocyclohexyl)methane, xylylenediamine, and phenylenediamine.

The relative viscosity [ηr] of the polyamide resin (B) is preferably in the range of 2.0 to 7.0 and more preferably in the range of 2.5 to 5.0. When the relative viscosity [ηr] is less than 2.0 the formation of pellets is not affected but the molded article obtained may have a deteriorated hot water resistance. On the other hand, when the relative viscosity [ηr] exceeds 7.0, the formation of pellets is not affected but the moldability during melt molding is deteriorated.

The method of producing the polyamide resin (B) is not particularly limited. However, in order to allow the terminals thereof to contain a suitable amount of imide structures, it is indispensable to use monomers containing imide bonds or to perform imidization during the production processes. Particularly, it is preferred to perform imidization during the production processes since it allows the molecular weight to be controlled easily. Specific examples thereof include: a) a method of controlling the degree of polymerization and the terminal structure by adding a terminal-blocking agent (D) and a molecular weight modifier when the polyamide resin (B) is polymerized; and b) a method of controlling the terminal structure by allowing the polyamide resin (C) to react with the terminal-blocking agent (D), with the polyamide resin (C) having been polymerized using a molecular weight modifier beforehand. The aforementioned production method b) is preferable since the terminals are blocked more reliably.

Examples of the molecular weight modifier include diamines each having a carbon number of 4 to 20, such as 1,4-butanediamine, 1,5-pentanediamine, 1,6-hexanediamine, 1,7'-heptanediamine, 1,8-octane diamine, 1,9- nonanediamine, cyclohexanediamine, cyclohexanedimethanamine, trimethylpentane-1,5-diamine, etc. Among them, 1,5-pentanediamine, 1,6-hexanediamine, and 1,7-heptanediamine are preferable from the viewpoints of reactivity and boiling point of the compound itself, accuracy in controlling molecular weight, and yield of intended polyamide resin (C).

Known molecular weight modifiers for a polyamide resin also can be used in combination with the aforementioned diamines as the molecular weight modifier. Examples of the known molecular weight modifiers include aliphatic monocarboxylic acids such as acetic acid, propionic acid, butyric acid, valeric acid, caproic acid, enanthic acid, caprylic acid, capric acid, pelargonic acid, myristic acid, palmitic acid, stearic acid, oleic acid, and linoleic acid; alicyclic monocarboxylic acids such as cyclohexane carboxylic acid and methyl cyclohexane carboxylic acid; and aromatic monocarboxylic acids such as benzoic acid, toluic acid, ethylbenzoic acid, and phenylacetic acid.

In the polyamide resin (C) that is obtained using a molecular weight modifier, it is preferable that at least 75 mol % of all the terminals be amino groups. When this ratio is less than 75 mol %, the ratio of the imide structures to the terminal structures of the polyamide resin (B) cannot be increased sufficiently. This ratio is preferably at least 80 mol %, more preferably at least 85 mol %.

Although the type of the polyamide resin (C) is not particularly limited, the polyamide resin (C) is preferably a polyamide resin composed mainly of caproamide. Specifically, it is preferable that at least 75 mol % of the structure units of the polyamide resin (C) be caproamide units. Examples of such a polyamide resin (C) include the same resins as those described as examples of the polyamide resin (B) above. Similarly, examples of the structure units other than the caproamide units in the polyamide resin (C) include those described as examples with respect to the polyamide resin (B).

The polyamide resin (C) can be obtained by, for example, mixing monomers that can form the aforementioned structure units with a molecular weight modifier, and melt-polymerizing the mixture at a temperature in the range of 200 to 280° C. for 0.2 to 4 hours. In order to allow at least 75 mol % of all the terminals of the resin to be amino groups, it is preferable that diamine be added in an amount in the range of 0.01 to wt % with respect to the above-mentioned monomers.

It is preferable that the relative viscosity [ηr] of the polyamide resin (C) thus obtained be in the range of 2.0 to 7.0 more preferably in the range of 2.5 to 5.0. When the relative viscosity [ηr] is less than 2.0, it may be difficult to form the polyamide resin (B) into a strand during the production thereof. On the other hand, when the relative viscosity [ηr] exceeds 7.0, the compatibility of the polyamide resin (C) with the terminal-blocking agent (D) may deteriorate. The aforementioned method can be used for the measurement of the relative viscosity [ηr].

The terminal-blocking agent (D) is not particularly limited as long as it is a compound that can form an imide structure together with the amino group contained in the polyamide resin (C). Examples of such a compound include cyclic acid anhydrides such as succinic anhydride, phthalic anhydride, glutaric anhydride, 3-methylglutaric anhydride, maleic anhydride, dimethylmaleic anhydride, trimellitic anhydride, and pyromellitic anhydride. Among them, phthalic anhydride and succinic anhydride are preferable from the viewpoints of reactivity with the amino group of the polyamide resin (C), thermal stability of the compound itself, etc. When the phthalic anhydride or succinic anhydride is used as the terminal-blocking agent (D), a phthalimide structure or a succinimide structure can be formed in at least a part of the units that block the terminals of the polyamide resin (B).

The polyamide resin (B) can be obtained by mixing the polyamide resin (C) with the terminal-blocking agent (D) to allow them to react with each other at a temperature in the range of 190 to 290° C., preferably in the range of temperatures that are 5° C. to 80° C. higher than the melting point of the polyamide resin (C), using a batch-type reactor, a single-screw or twin-screw melt extruder, etc. When the reaction temperature is lower than 190° C., the reactivity between the polyamide resin (C) and the terminal-blocking agent (D) may deteriorate. On the other hand, when the reaction temperature exceeds 290° C., the polyamide resin (C) itself may be decomposed thermally.

The amount of the terminal-blocking agent (D) to be added is preferably in the range of 0.95 to 3.0 equivalents more preferably in the range of 1.0 to 2.0 equivalents, with respect to the amount of the amino groups in the polyamide resin (C). When the amount of the terminal-blocking agent (D) to be added is less than 0.95 equivalents, the amount of the imide structures contained in the polyamide resin (B) to be obtained may be insufficient. On the other hand, when the amount of the terminal-blocking agent (D) to be added exceeds 3.0 equivalents, problems such as color tone defects and bleed-out of unreacted products may occur in the polyamide resin (B) obtained. The time for the reaction between the polyamide resin (C) and the terminal-blocking agent (D) is preferably in the range of 0.1 to 30 minutes.

In the multilayered pellet of the present invention, the weight ratio (A/B) of the resin layer A to the resin layer B is preferably in the range of 95/5 to 50/50, more preferably in the range of 92/8 to 50/10, and further preferably in the range of 90/10 to 70/30. When the weight ratio (A/B) exceeds 95/5, the molded article obtained may have a deteriorated hot water resistance. On the other hand, when the weight ratio is lower than 50/50, the molded article obtained may have a deteriorated gas barrier property.

The method of producing a multilayered pellet of the present invention is not particularly limited Known apparatuses and methods can be used. For instance, a twin-screw melt extruder can be used for forming the polyamide resin (B), while a multilayer die, a cooling bath, a pelletizer, and a dryer can be used for forming a multilayered pellet from the EVOH (A) and the polyamide resin (B). In addition, a single-screw melt extruder can be used for introducing the EVOH (A) into the multilayer die, for example.

Specifically, for example, the EVOH (A) is melted by being heated to a temperature that is 20° C. to 60° C. higher than its melting point and then is introduced into a multilayer die, using a single-screw melt extruder. In addition using a twin-screw melt extruder a material obtained by dry-blending the polyamide resin (C) and the terminal-blocking agent (D) is heated to be melted, thereby the polyamide resin (C) and the terminal-blocking agent (D) are allowed to react with each other to form the polyamide resin (B), and then the polyamide resin (B) is introduced into the aforementioned multilayer die. In this case the EVOH (A) is introduced into a core nozzle of the multilayer die while the polyamide resin (B) is introduced into a sheath holder. Accordingly, a multilayered strand having a core-sheath structure in which the core layer and the sheath layer are formed of the EVOH (A) and the polyamide resin (B), respectively, is discharged from the die. The strand thus discharged can be cooled in the cooling bath and can be cut into a suitable length with the pelletizer. After cutting, it can be dried until it has a suitable moisture percentage, if necessary. In this method, the weight ratio between the resin layers A and B can be changed by changing the shape of the multilayer die.

Furthermore, the polyamide resin (B) that has been formed separately beforehand can be heated to be melted and can be introduced into the aforementioned multilayer die using another single-screw melt extruder that is different from the one used for the EVOH (A).

The multilayered pellets of the present invention can be supplied as a raw material for a resin molded article and can be molded into various molded articles such as, for example, films, sheets containers, and other packaging materials by melt molding. The resin molded articles of the present invention thus obtained contain a reduced amount of residual gels and therefore have better quality (excellent properties such as excellent gas barrier properties, hot water resistance, appearance, etc.). Hence, the resin molded articles of the present invention are used suitably for food packaging, especially for containers, bags, pouches, lids for containers, packaging containers for boiling sterilized or retort sterilized food products, etc that are sealed hermetically by heat sealing. The resin molded articles of the present invention also are excellent for the use for packaging materials other than those for food products, for example, packaging materials for pharmaceutical products, agricultural chemicals, cosmetics, detergents, organic chemicals, components for audio products, and stationery.

EXAMPLES

Hereinafter, the present invention is described further in detail using examples. The present invention is not limited to the examples described below. The quantification of measured values in the examples was carried out by the following respective methods. The water used in the examples was ion exchanged water.

1. Relative Viscosity [ηr] of Polyamide Resin

A polyamide resin used as a sample was dissolved in 98 wt % concentrated sulfuric acid so as to have a concentration of 1 g/dL. Thus, a polyamide resin solution was formed. Next, viscosity of the solution thus formed was measured with an Ubbelohde viscometer (measurement temperature: 25° C.) and thereby relative viscosity (dimensionless quantity) was obtained. This method is a method according to JIS K 6810. However, the relative viscosity [ηr] of the polyamide resin can be measured according to JIS X 6920-2 into which JIS K 6810 has been integrated 2. Amount of Terminal Amino Groups in Polyamide Resin A suitable amount of polyamide resin used as a sample was dissolved in phenol. The solution thus obtained was titrated with a 0.05 N hydrochloric acid. Thus the amount (μeq/g) of terminal amino groups was obtained.

3 Amount of Terminal Carboxylic Acid in Polyamide Resin

A suitable amount of polyamide resin used as a sample was dissolved in benzyl alcohol. The solution thus obtained was titrated with a 0.05 N potassium hydroxide solution. Thus the amount (μeq/g) of terminal carboxylic acid was obtained 4. Amount of Terminal Imide Structures in Polyamide Resin A polyamide resin used as a sample was dissolved in deuterated hexafluoroisopropanol. This solution was subjected to NMR measurement using a nuclear magnetic resonance spectrometer, GX-500 (500 MHz-NMR), manufactured by JEOL Ltd. Then, from the ratio between the peak area of hydrogen of the methylene group adjacent to the terminal imide structure and the peak area of hydrogen of the methylene group adjacent to the amide structure in the spectrum obtained above, the amount (μeq/g) of terminal imide structures was obtained in terms of value per weight of polyamide resin.

5. Ratio of Terminal Amino Groups and Ratio of Terminal Imide Structures

With the total of the amounts of terminals obtained in the aforementioned articles 2 to 4 being considered as the amount of all the terminals, the ratios (mol %) of the terminal amino groups and the terminal imide structures were calculated.

Example 1

Production of Polyamide Resin B-1

Ten kilograms of epsilon-caprolactam as a monomer, 82 g of 1,6-hexanediamine as a molecular weight modifier, and 1.0 kg of water were placed in a 30-liter pressure-resistant reactor. The mixture was heated to 260° C. while being stirred and the pressure was increased to 0.5 MPa. Thereafter, the pressure was released to normal pressure, and polymerization was performed at 260° C. for three hours Upon completion of the polymerization, the reaction product was discharged in the form of a strand and was cooled to be solidified. Then it was cut into pellets. The pellets thus obtained were washed with a 95° C. hot water and then were dried. Thus a polyamide resin C-1 was obtained. The relative viscosity the amount of terminal amino groups, etc of the polyamide resin C-1 are indicated in Table 1 below.

Next, 5 kg of the polyamide resin C-1 and 80 g of phthalic anhydride used as the terminal-blocking agent (D) were dry-blended and were mixed together to react with each other at 260° C. with a twin-screw melt extruder. The reaction product was discharged in the form of a strand and was cooled to be solidified. Then it was cut into pellets. Thus the polyamide resin B-1 was obtained in the form of pellets. The relative viscosity, the amount of terminal imide structures, etc. of the polyamide resin 1-1 are indicated in Table 2 below.

Example 2

Production of Polyamide Resin B-2

A polyamide resin C-2 was obtained in the same manner as in Example 1 except that the amount of 1,6-hexanediamine was 75 g. The relative viscosity, the amount of terminal amino groups, etc. of the polyamide resin C-2 are indicated in Table 1 below.

Subsequently, a polyamide resin B-2 was obtained in the same manner as in Example 1 except that the polyamide resin C-2 was used instead of the polyamide resin C-1 and 50 g of succinic anhydride was used as the terminal-blocking agent (D). The relative viscosity, the amount of terminal imide structures, etc. of the polyamide resin B-2 are indicated in Table 2 below.

Comparative Example 1

Production of Polyamide Resin B-3

A polyamide resin C-3 was obtained in the same manner as in Example 1 except that 43 g of acetic acid was used as a molecular weight modifier. The relative viscosity, the amount of terminal amino groups, etc. of the polyamide resin C-3 are indicated in Table 1 below.

Subsequently, a polyamide resin B-3 was obtained in the same manner as in Example 1 except that the polyamide resin C-3 was used instead of the polyamide resin C-1 and the amount of phthalic anhydride used herein was 29 g. The relative viscosity, the amount of terminal imide structures, etc. of the polyamide resin B-3 are indicated in Table 2 below.

Comparative Example 2

Production of Polyamide Resin 3-4

Nylon 6, Ube Nylon 1011FK, manufactured by Ube Industries, Ltd. was used as a polyamide resin C-4. The relative viscosity, the amount of terminal amino groups, etc. of the polyamide resin C-4 are indicated in Table 1 below.

Subsequently, a polyamide resin 3-4 was obtained in the same manner as in Example 1 except that the polyamide resin C-4 was used instead of the polyamide resin C-1 and the amount of phthalic anhydride used herein was 38.5 g. The relative viscosity, the amount of terminal imide structures, etc. of the polyamide resin B-4 are indicated in Table 2 below.

TABLE 1

<Table 1a>

|  | Polyamide Resin | Monomer (x) | Molecular Weight Modifier (y) | y/x (g/g) |
| --- | --- | --- | --- | --- |
| Example 1 | C-1 | epsilon-caprolactam | 1,6-hexanediamine | 82/10000 |
| Example 2 | C-2 | epsilon-caprolactam | 1,6-hexanediamine | 75/10000 |
| Comparative Example 1 | C-3 | epsilon-caprolactam | acetic acid | 43/10000 |
| Comparative Example 2 | C-4[*1] | — | — | — |

<Table 1b>

|  | Polyamide Resin | Relative Viscosity [ηr] | Amount of Terminal Amino Groups (μeq/g) | Amount of Terminal Carboxylic Acid (μeq/g) | Amount of Terminal Imide Structures (μeq/g) | Ratio of Terminal Amino Groups (mol %) |
| --- | --- | --- | --- | --- | --- | --- |
| Example 1 | C-1 | 2.7 | 81 | 16 | 0 | 84 |
| Example 2 | C-2 | 2.6 | 77 | 21 | 0 | 79 |
| Comparative Example 1 | C-3 | 2.5 | 30 | 75 | 0 | 29 |
| Comparative Example 2 | C-4[*1] | 2.4 | 40 | 68 | 0 | 37 |

[*1]Ube Nylon 1011FK, manufactured by Ube Industries, Ltd.

TABLE 2

<Table 2a>

|  | Polyamide Resin (B) | Polyamide Resin (C) | Terminal-Blocking Agent (D) | D/C (g/g) |
| --- | --- | --- | --- | --- |
| Example 1 | B-1 | C-1 | phthalic anhydride | 80/5000 |
| Example 2 | B-2 | C-2 | succinic anhydride | 50/5000 |
| Comparative Example 1 | B-3 | C-3 | phthalic anhydride | 29/5000 |
| Comparative Example 2 | B-4 | C-4 | phthalic anhydride | 38.5/5000 |

<Table 2b>

|  | Polyamide Resin (B) | Relative Viscosity [ηr] | Amount of Terminal Amino Groups (μeq/g) | Amount of Terminal Carboxylic Acid (μeq/g) | Amount of Terminal Imide Structures (μeq/g) | Ratio of Terminal Imide Structures (mol %) |
| --- | --- | --- | --- | --- | --- | --- |
| Example 1 | B-1 | 2.6 | 4 | 20 | 77 | 76 |
| Example 2 | B-2 | 2.6 | 7 | 23 | 73 | 71 |
| Comparative Example 1 | B-3 | 2.5 | 4 | 50 | 53 | 50 |
| Comparative Example 2 | B-4 | 2.2 | 8 | 75 | 33 | 28 |

Example 3

Eval F101 (ethylene unit content: 32 mol %, saponification degree: 99.9%, MFR: 3.0 g/10 minutes (at a temperature of 210° C. with a load of 2160 g)) manufactured by KURARAY CO., LTD that was used as the EVOH (A) was supplied to a single-screw melt extruder (A) and was heated at 230° C. to be melted. Separately, the resin B-1 produced in Example 1 that was used as the polyamide resin (B) was supplied to a single-screw melt extruder (B) and was heated at 240° C. to be melted. Subsequently the molten EVOH and polyamide resin B-1 were supplied to a multilayer die. Then a strand having a core-sheath structure composed of a core layer formed of the EVOH and a sheath layer formed of the polyamide resin (with a weight ratio of the core layer to the sheath layer of 70/30) was discharged from the multilayer die. The strand thus discharged was cooled to be solidified in the cooling bath. Then this was cut into pellets as shown in FIG. 1.

Next, the pellets thus obtained were supplied to a single-screw melt extruder equipped with a full-flight type screw whose diameter was 40 mm and a coat-hanger die whose width was 550 mm. The pellets then were heated at 240° C. to be melted. Using this a 15-µm thick film was formed continuously for 24 hours. The film obtained after 24 hours was subjected to a film surface evaluation and a hot water resistance evaluation by the following methods. The evaluation results are indicated in Table 3 below.

6. Film Surface Evaluation

The number of gels (with a diameter of at least about 200 µm) remaining in the film obtained was counted visually. Then the number of gels was indicated in terms of the number per 1.0 m² of the film. According to the number per 1.0 m² of the film, the film surface was evaluated as follows.

○ (good): less than 20

Δ (fair): at least 20 but less than 50

× (poor): at least 50 but less than 100

×× (worse): at least 100

7. Hot Water Resistance Evaluation

The film obtained was used as an intermediate layer. A biaxially-oriented nylon 6 film (Emblem, manufactured by UNITIKA LTD., with a thickness of 15 µm) was used as an outer layer. A non-oriented polypropylene film (RXC-7, manufactured by Tohcello Co, Ltd, with a thickness of 60 µm) was used as an inner layer. Takenate A-385/A-50 manufactured by Takeda Chemical Industries, Ltd. was applied (with a solid content of 4 g/m²) onto those films as an adhesive (two-component type, urethane-based) for dry lamination. Then the solvent was evaporated at 80° C. Thereafter, the films were bonded together. This was aged at 40° C. for five days. Thus a multilayered film was obtained.

Next, the multilayered film thus obtained was subjected to a hot water treatment at 120° C. for 30 minutes using retort equipment (a high-temperature and high-pressure cooking sterilization tester RCS-40RTGN, manufactured by HISAKA WORKS, LTD.). After the hot water treatment, it was stored in a room at 20° C. and 65% RH for one day. Then the appearance of the multilayered film was evaluated according to the following criteria.

○ (good): Separation between the intermediate layer and the inner and outer layers is not observed, while the transparency of the intermediate layer is maintained.

Δ (fair): Separation between the intermediate layer and the inner and outer layers is not observed, while the transparency of the intermediate layer has been impaired slightly but is in a practically acceptable range.

× (poor): Separation between the intermediate layer and the inner and outer layers is observed and the transparency of the intermediate layer has been impaired.

Example 4

A film was formed continuously for 24 hours in the same manner as in Example 1 except that the resin B-2 produced in Example 2 was used as the polyamide resin (B). The film obtained after 24 hours was subjected to the film surface evaluation and the hot water resistance evaluation in the same manner as in Example 3. The evaluation results are indicated in Table 3 below.

Comparative Example 3

A film was formed continuously for 24 hours in the same manner as in Example 1 except that the resin C-1 produced in Example 1 was used as the polyamide resin (B). The film obtained after 24 hours was subjected to the film surface evaluation in the same manner as in Example 3. The evaluation result is indicated in Table 3 below. As indicated in Table 3, the film surface was evaluated as "×× (worse)" in Comparative Example 3. Accordingly, the hot water resistance evaluation was not carried out.

Comparative Example 4

A film was formed continuously for 24 hours in the same manner as in Example 1 except that the resin B-3 produced in Comparative Example 1 was used as the polyamide resin (B). The film obtained after 24 hours was subjected to the film surface evaluation and the hot water resistance evaluation in the same manner as in Example 3. The evaluation results are indicated in Table 3 below.

Comparative Example 5

A film was formed continuously for 24 hours in the same manner as in Example 1 except that the resin B-4 produced in Comparative Example 2 was used as the polyamide resin (B). The film obtained after 24 hours was subjected to the film surface evaluation in the same manner as in Example 3. The evaluation result is indicated in Table 3 below. As indicated in Example 3, the film surface was evaluated as "×× (worse)" in Comparative Example 5. Accordingly, the hot water resistance evaluation was not carried out.

TABLE 3

| | EVOH (A) | Polyamide Resin (B) | | Weight Ratio (A/B) | Film Surface Evaluation | Hot Water Resistance Evaluation |
| --- | --- | --- | --- | --- | --- | --- |
| | | Type | Ratio of Terminal Imide Structures (mol %) | | | |
| Example 3 | F101 | B-1 | 76 | 70/30 | ○ | ○ |
| Example 4 | F101 | B-2 | 71 | 70/30 | X X | ○ |
| Comparative Example 3 | F101 | C-1 | 0 | 70/30 | X X | Not Evaluated |
| Comparative Example 4 | F101 | B-3 | 50 | 70/30 | X | ○ |
| Comparative Example 5 | F101 | B-4 | 28 | 70/30 | X X | Not Evaluated |

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description and all changes that come within the meaning and range of equivalency of the claims are intended to be embraced therein.

INDUSTRIAL APPLICABILITY

As described above, the present invention can provide multilayered pellets that contain EVOH and a polyamide resin and that have excellent thermal stability during pelletizing and melt molding. Furthermore, when the multilayered pellets of the present invention are used as a raw material and are melt-molded, the amount of residual gels is reduced and thereby resin molded articles can be obtained that have better quality (excellent properties such as excellent gas-barrier properties, hot water resistance, appearance, etc.).

The invention claimed is:

1. A multilayered pellet composed of at least two resin layers,
    wherein the multilayered pellet comprises a resin layer A whose main component is an ethylene-vinyl alcohol copolymer and a resin layer B whose main component is a polyamide resin, and
    at least 70 mol % of all terminals of the polyamide resin are blocked by units each containing an imide structure.

2. The multilayered pellet according to claim 1, wherein the multilayered pellet has a core-sheath structure including:
    the resin layer A as a core layer, and
    the resin layer B as a sheath layer that covers a peripheral surface of the core layer.

3. The multilayered pellet according to claim 1, wherein the ethylene-vinyl alcohol copolymer has an ethylene unit content in a range of 10 to 65 mol % and a saponification degree of at least 90 mol %.

4. The multilayered pellet according to claim 1, wherein the polyamide resin has a relative viscosity in a range of 2.0 to 7.0.

5. The multilayered pellet according to claim 1, wherein the polyamide resin has an amount of terminal amino groups of 10 µeq/g or less.

6. The multilayered pellet according to claim 1, wherein a weight ratio (A/B) of the resin layer A to the resin layer B is in a range of 95/5 to 50/50.

7. The multilayered pellet according to claim 1, wherein the resin layer A is formed of an ethylene-vinyl alcohol copolymer, while the resin layer B is formed of a polyamide resin.

8. The multilayered pellet according to claim 1, wherein the at least 75 mol % of the structural units of the polyamide resin are caproamide units.

9. The multilayered pellet according to claim 1, wherein the polyamide resin is at least one selected from the group consisting of polycapramide, a caprolactam/lauryl lactam copolymer and a caprolactam/hexamethylene adipamide copolymer.

10. The multilayered pellet according to claim 1, wherein the polyamide resin includes a unit derived from a diamine molecular weight modifier.

11. The multilayered pellet according to claim 1, wherein the ethylene-vinyl alcohol copolymer comprises polymerized units of one or more monomer units selected from the group consisting of vinyl acetate, vinyl propionate and vinyl pivalate, and has a saponification degree of at least 90 mol %.

12. The multilayered pellet according to claim 1, wherein the weight ratio of the resin layer A to the resin layer B is from 90/10 to 70/30.

13. The multilayered pellet according to claim 1, which consists of the resin layers A and B.

14. The multilayered pellet according to claim 1, wherein at least 75 mol % of all of the terminals of the polyamide resin are derived from amino groups.

15. The multilayered pellet according to claim 1, wherein at least 85 mol % of all of the terminals of the polyamide resin are derived from amino groups.

* * * * *

UNITED STATES PATENT AND TRADEMARK OFFICE
CERTIFICATE OF CORRECTION

PATENT NO.      : 7,875,353 B2
APPLICATION NO. : 11/574424
DATED           : January 25, 2011
INVENTOR(S)     : Syukiti Kawamura Page 1 of 1

It is certified that error appears in the above-identified patent and that said Letters Patent is hereby corrected as shown below:

In column 13, Table 3, Example 4, "XX" should read --○--

Signed and Sealed this
Fourteenth Day of June, 2011

David J. Kappos
*Director of the United States Patent and Trademark Office*